(12) United States Patent
Ahmed et al.

(10) Patent No.: US 7,328,251 B2
(45) Date of Patent: *Feb. 5, 2008

(54) THREAD BASED EMAIL

(75) Inventors: Muhammad A. Ahmed, Redmond, WA (US); Mohammad Shabbir Alam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

This patent is subject to a terminal disclaimer.

(21) Appl. No.: 10/753,705

(22) Filed: Jan. 8, 2004

(65) Prior Publication Data
US 2004/0148359 A1 Jul. 29, 2004

Related U.S. Application Data

(63) Continuation of application No. 09/399,417, filed on Sep. 20, 1999, now Pat. No. 6,704,772.

(51) Int. Cl.
*G06F 15/16* (2006.01)
(52) U.S. Cl. ...................... 709/207; 709/204
(58) Field of Classification Search ............... 709/203, 709/204–208, 228, 246, 219; 719/310; 707/2, 707/10, 204; 725/115; 370/438
See application file for complete search history.

(56) References Cited

U.S. PATENT DOCUMENTS 4,625,081 A * 11/1986 Lotito et al. ............. 379/88.26
5,255,389 A * 10/1993 Wang ......................... 707/10
5,388,049 A    2/1995 Sansone et al. ......... 364/464.02
5,586,264 A * 12/1996 Belknap et al. ............. 725/115

(Continued)

FOREIGN PATENT DOCUMENTS

EP         0 471 639 A2      2/1992

(Continued)

OTHER PUBLICATIONS

Detection of response time failures of real-time softwarePekilis, B.R.; Seviora, R.E.;PROCEEDINGS The Eighth International Symposium On Software Reliability EngineeringNov. 2-5, 1997 pp. 38-47.*

(Continued)

*Primary Examiner*—Thong Vu
(74) *Attorney, Agent, or Firm*—Workman Nydegger

(57) ABSTRACT

Systems and methods for providing electronic messaging services to multiple users by storing a single copy of an electronic message at a central location and notifying recipients of the stored single copy. An electronic message includes a distribution list and a message content. A distribution list identifying multiple recipients causes prior art systems to duplicate the entire message for each recipient, placing potentially large demands on both processing power and storage space. In contrast, the systems and methods disclosed herein store a single copy or a limited number of copies of an electronic message addressed to multiple recipients and provide each recipient with a relatively small notification. In addition to providing information regarding content and origin, the notification also provides access to the stored message. Furthermore, the methods and systems also aid in organizing replies to electronic messages. Replies are associated with an initial message through a message identifier. The association helps to organize electronic messages by subject and provides context without requiring an author to duplicate the content of the initial message with the reply.

18 Claims, 5 Drawing Sheets

U.S. PATENT DOCUMENTS

| | | | | |
|---|---|---|---|---|
| 5,621,727 | A | | 4/1997 | Vaudreuil .................... 370/60 |
| 5,661,781 | A | | 8/1997 | DeJager ....................... 379/67 |
| 5,668,958 | A | * | 9/1997 | Bendert et al. ............ 710/305 |
| 5,761,678 | A | * | 6/1998 | Bendert et al. ............ 707/204 |
| 5,778,395 | A | * | 7/1998 | Whiting et al. ............ 707/204 |
| 5,823,788 | A | * | 10/1998 | Lemelson et al. .......... 434/350 |
| 5,887,170 | A | * | 3/1999 | Ansberry et al. ........... 709/204 |
| 5,914,957 | A | * | 6/1999 | Dean et al. ................. 370/438 |
| 5,930,471 | A | | 7/1999 | Milewski et al. ...... 395/200.04 |
| 5,940,740 | A | | 8/1999 | Aas et al. .................. 455/31.3 |
| 5,956,521 | A | | 9/1999 | Wang ......................... 395/855 |
| 5,959,989 | A | * | 9/1999 | Gleeson et al. ............ 370/390 |
| 5,964,833 | A | | 10/1999 | Kikinis ....................... 709/206 |
| 5,974,532 | A | | 10/1999 | McLain et al. ............ 712/208 |
| 5,978,791 | A | * | 11/1999 | Farber et al. .................. 707/2 |
| 5,995,597 | A | | 11/1999 | Woltz et al. ............ 379/93.24 |
| 6,021,419 | A | | 2/2000 | Clarke, Jr. et al. .......... 709/300 |
| 6,029,195 | A | | 2/2000 | Herz .......................... 709/219 |
| 6,065,044 | A | | 5/2000 | Ogasawara ................. 709/207 |
| 6,085,232 | A | | 7/2000 | Kikinis ....................... 709/206 |
| 6,112,244 | A | * | 8/2000 | Moore et al. ............... 709/228 |
| 6,138,168 | A | * | 10/2000 | Kelly et al. ................. 719/310 |
| 6,148,064 | A | | 11/2000 | Christensen et al. ..... 379/88.12 |
| 6,192,396 | B1 | | 2/2001 | Kohler ....................... 709/206 |
| 6,201,814 | B1 | | 3/2001 | Greenspan .................. 370/428 |
| 6,212,553 | B1 | | 4/2001 | Lee et al. .................... 709/206 |
| 6,247,065 | B1 | | 6/2001 | Greenspan et al. ......... 709/313 |
| 6,249,807 | B1 | | 6/2001 | Shaw et al. ................. 709/206 |
| 6,262,652 | B1 | | 7/2001 | Bolton ......................... 340/7.2 |
| 6,263,212 | B1 | | 7/2001 | Ross et al. .................. 455/466 |
| 6,324,581 | B1 | * | 11/2001 | Xu et al. ..................... 709/229 |
| 6,324,587 | B1 | * | 11/2001 | Trenbeath et al. .......... 719/310 |
| 6,330,079 | B1 | | 12/2001 | Dugan et al. ............... 358/403 |
| 6,330,589 | B1 | * | 12/2001 | Kennedy ..................... 709/206 |
| 6,335,963 | B1 | | 1/2002 | Bosco ..................... 379/88.12 |
| 6,351,524 | B1 | | 2/2002 | Schuster et al. ......... 379/88.23 |
| 6,351,764 | B1 | * | 2/2002 | Voticky et al. .............. 709/207 |
| 6,385,655 | B1 | | 5/2002 | Smith et al. ................. 709/232 |
| 6,441,916 | B1 | * | 8/2002 | Toyoda ...................... 358/1.15 |
| 6,442,592 | B1 | * | 8/2002 | Alumbaugh et al. ........ 709/206 |
| 6,631,398 | B1 | * | 10/2003 | Klein ......................... 709/206 |
| 6,845,391 | B1 | * | 1/2005 | Aas et al. .................... 709/206 |
| 7,007,003 | B1 | * | 2/2006 | Rybicki ........................... 707/1 |
| 2002/0073236 | A1 | * | 6/2002 | Helgeson et al. ........... 709/246 |
| 2003/0154244 | A1 | * | 8/2003 | Zellers et al. ............... 709/203 |
| 2004/0039798 | A1 | * | 2/2004 | Hotz et al. .................. 709/219 |

FOREIGN PATENT DOCUMENTS

| | | |
|---|---|---|
| EP | 0475868 | 3/1992 |
| EP | 0561649 | 9/1993 |
| EP | 0 739 115 A2 | 10/1996 |
| EP | 0 785 661 A2 | 7/1997 |

OTHER PUBLICATIONS

RFC 1045; www.graphcomp.com/info/rfc/rfc1045.html.*

Simple Hit-Metering and Usage-Limiting for HTTP, 1998 ; www.arctic.org/~dean/apache/standards/draft-ietf-http-hit-metering-03.txt.*

Guidelines for a Structure of an Integrated System of Contingency Planning for Shipboard Emergencies www.uscg..mil/hq/g-m/nmc/imo/pdf/Circ1/Msc0/760.pdf.*

Tone and announcement message code generator for telephonic switching system—has single message memory, multichannel interface circuit, share memory for ID codes, and sequencer responsive to commnads issued by controller. Derwent Acct 1992-242189.*

"Distributing a Document Using a Regional Reference," IBM Technical Disclosure Bulletin, vol. 33, No. 3A, Aug. 1990, p. 251.

Lockhead, "The Use of Internet-Based Technologies—Beyond E-mail and Search Engines," *IEEE* 1998.

Miller et al, "Generic Signaling Protocol: Switching, Networking Internetworking," *IEEE* 1992.

Katagishi et al, "A Public Key Cryptography-Based Security Enhanced Mail Gateway with the Mailing List Function," *IEEE* 1999.

"Multimedia Transport Protocol and Multicast Communication—Fdida" (1996); www.rp.lip6.fr/pub/fdida/Dagstuhl.ps.

Conklin, Jeff and Begeman, Michael, L. *gIBIS: A Hypertext Tool for Exploratory Policy Discussion*, MCC, Software Technology Program, ACM Transactions on Office Information Systems, vol. 6, No. 4, Oct. 1988.

* cited by examiner

THREAD BASED EMAIL

CROSS-REFERENCE TO RELATED APPLICATIONS

The present application is a continuation of U.S. patent application Ser. No. 09/399,417, filed Sep. 20, 1999 now U.S. Pat. No. 6,704,772, and entitled "Thread Based Email." The foregoing application is incorporated herein by reference in its entirety.

BACKGROUND OF THE INVENTION

1. The Field of the Invention

The present invention relates to methods and systems for delivering and organizing electronic messages. More specifically, the present invention relates to methods and systems that may be used to reduce the computing resources necessary for delivering a single message to multiple recipients and to improve the organization of responses to the message.

2. Background and Relevant Art

Traditional electronic messaging systems are a huge improvement over the paper analogues they augment or replace. By reducing the human and material resources necessary to transcribe, photocopy, and distribute paper communications, electronic messaging allows for resources to be focused on core business objectives rather than wasted on overhead. However, the contribution of prior art electronic messaging systems can be characterized as replacing physical inefficiencies with electronic ones.

Specifically, prior art electronic messaging systems distribute a single message to multiple recipients by duplicating the message and delivering a copy to each recipient. The two major inefficiencies that result include both processing time to duplicate the message and storage space to hold the copies. For example, consider what occurs when prior art systems deliver a three kilobyte message to all three thousand employees of a particular business. The prior art electronic messaging systems must dedicate processing resources to duplicate the three kilobyte message three thousand times, producing some nine megabytes of data that must be stored in the computer systems of the business.

Admittedly, with today's computer systems, duplicating a file three thousand times and storing nine megabytes of data are minor concerns, when viewed in isolation. However, several other factors render this drain on computer resources more serious. For example, electronic messaging systems operate on many individual messages. Duplicating a single message three thousand times is the equivalent of receiving three thousand messages at once. When combined with the normal operating conditions of the electronic messaging system, a sudden requirement to process three thousand messages can dramatically reduce system performance.

This problem is further complicated when recipients begin replying to widely distributed electronic messages. Because replies may be difficult to understand in isolation, the original message is often copied with the reply to avoid misunderstandings. Furthermore, the replies are often distributed to all original recipients, multiplying the initial nine megabytes of data by a factor of two and adding another three thousand messages the size of the reply.

However, copying the original message with a reply provides only minimal context. By its very nature, recipients will read and respond to a widely distributed electronic message over a substantial period of time. Some recipients may be out of the office, for hours at a meeting or days on vacation, when certain electronic messages are delivered. Some recipients will be involved in other work when the message is delivered and postpone reading and/or response to a more convenient time. Others, however, will read and respond immediately. This response time delay leads prior art electronic messaging system to intersperse responses with unrelated messages received in the interim. Moreover, if a specific electronic message generates a large amount of discussion, it may be advantageous to divide an initial topic into several subtopics. However, prior art electronic messaging systems provide only limited support for organizing electronic messages by topic, such as rules for sorting messages by sender.

Furthermore, electronic messaging typically provides only limited formatting capabilities. Many messages, however, require fairly sophisticated presentation. Enhanced formatting may be important as a means of efficiently communicating information. Perhaps a table of data quickly conveys the message that would otherwise require significant amounts of text. Alternatively, higher degrees of formatting generally connote an increased level of importance or authority. The effect of requiring a high degree of formatting often leads to electronic messages containing attachments of word processing documents that provide the increased formatting capabilities. Unfortunately, the formatting information of a document may contribute as much to a document's size as the text of the document itself and introduces a certain amount of overhead. Thus, three kilobytes is an extremely conservative size for an email message with an attached word processing document. It is not uncommon for even simple word processing documents to be in the range of ten to twenty kilobytes. A twenty kilobyte attachment sent to three thousand recipients with a single reply that includes the original message represents 120 megabytes of data—for a single communication. The problem may be at its worst when a fifty kilobyte image or 100 kilobyte program is involved.

Because the copies are electronic, little consideration is given to the resources that are required for delivering electronic messages. It is a simple matter for the average person to recognize the effort in physically duplicating something three thousand times. Few if any would even consider making a short (or even humorous) comment in a paper system that requires three thousand copies of the comment, three thousand duplicates of the original message, time to attach the comment to the duplicates, and manual distribution to three thousand people. However, in an electronic messaging context, senders give little consideration to the computing resources necessary for processing widely distributed messages and the possible impact of replies.

Nevertheless, some prior art electronic messaging systems provide ill-suited solutions to the processing and storage problems introduced by multiple recipient messages. For example, public folders and newsgroups both provide a mechanism for placing information in a common area where it can be accessed by multiple requesters without being duplicated for each. While newsgroups and public folders provide a topical arrangement of information, they lack the ability to direct messages to an easily modifiable group of recipients. Specifically, newsgroups and public folders require a user to post information and then depend on those who are interested in the topic to periodically check for new messages. This operation renders newsgroups and public folders virtually useless for ad hoc electronic discussions.

Moreover, newsgroups and public folders provide limited capabilities for controlling access to posted information. For example, access to newsgroups and public folders can be controlled by users, but access cannot be tailored on a message by message basis. This limitation imposes a need for newsgroups and public folders to be created based on both topic and anticipated distribution, leading to a proliferation of newsgroups and public folders that must be checked periodically for new messages.

Finally, growing enthusiasm for the Internet further contributes to the problems in the prior art because an increasing number of people have access to electronic messaging services. This increased access enhances the ability to interact with one another and increases the likelihood that a single message will be meaningful to multiple recipients, further aggravating processing and storage problems. The prior art demands either sacrificing performance, limiting distribution, or designing systems to support the inefficiencies at their peak demand.

SUMMARY AND OBJECTS OF THE INVENTION

The problems in the prior state of the art have been successfully overcome by the present invention which is directed to methods and systems for improved distribution of electronic messages directed to multiple recipients and improved organization of replies to an electronic message. The improvement eliminates inefficiencies in processing power and storage space caused by duplicating electronic messages and provides enhanced organization by grouping replies with the original message.

More specifically, in one embodiment of the present invention, a host system providing electronic messaging services efficiently distributes electronic messages to multiple recipients. In contrast to the prior art's need to duplicate a message for each recipient, the host system stores as few as one copy of the electronic message, notifies each recipient of the stored message, and includes with the notification a link for accessing the stored message. Therefore, the host system saves both the processing time that would otherwise be used for duplicating and the corresponding storage space required to hold each of the duplicated messages.

Alternatively, the invention can be practiced using multiple host systems, each providing electronic messaging services to a particular set of clients. With multiple host systems, the host system originating a message creates a list identifying host systems providing electronic messaging services for each recipient and a list of recipients for each of the identified host systems. Then, for each host system, the originating system sends a host-specific list of recipients and a copy of the electronic message. However, in a multiple host system environment, an originating host system may determine that another host system providing electronic messaging service to certain recipients is unsupported in that it does not provide the full functionality of the invention disclosed herein. Upon identifying an unsupported host system, the originating host system sends the electronic message using another protocol that is compatible with the unsupported host system.

Yet another embodiment of the present invention provides for organizing related electronic messages. Replies may be associated with an earlier message by assigning an identifier to the initial electronic message. This association enhances a client's ability to establish the context of a reply. For example, assigning an identifier allows for the automated creation of a message-specific storage mechanism to hold the original message as well as all subsequent replies to that initial message. As electronic messages with identifiers are distributed, at least one storage mechanism for each initial message is created. Electronic messages that are replies are associated with their corresponding initial message by being placed in the storage mechanism previously created for each particular initial message.

The storage mechanism for initial messages may also comprise means for indicating the presence of electronic messages that have not been opened by the client. When a client selects a particular storage mechanism, only electronic messages associated with the message identifier will be presented. Within each storage mechanism, replies may be organized in a tree, hierarchical (parent-child), or other suitable arrangement; replies may be further ordered by time of receipt. Associating a replies in this manner also allows for the elimination of common text among messages. There is no motivation for a reply to duplicate an earlier message within the reply itself because it is a relatively simple matter to access the earlier message.

Although presented separately, the aspects of the present invention summarized above should not be considered as mutually exclusive. Rather, when combined, these aspects cooperate to greatly enhance the art of electronic messaging. Furthermore, some attributes are common among diverse embodiments of the present invention. For example, the ability to alter a distribution list for granting or denying access to one or more recipients, message specific rules that determine the lifetime of a particular message or control access to the message, and host-specific rules that provide a similar function all may enhance the embodiments described above.

It is, therefore, an object of the present invention to provide methods and systems for reducing both the processing and storage space resources associated with electronically sending a message to multiple recipients.

It is a further object of the present invention to provide methods and systems for tracking and dynamically controlling access to an electronic message.

It is yet another object of the present invention to provide methods and systems for organizing related electronic messages.

It is also an object of the present invention to provide methods and systems capable of interacting with host systems that do not operate according to the present invention.

Additional objects and advantages of the invention will be set forth in the description which follows, and in part will be obvious from the description, or may be learned by practicing the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
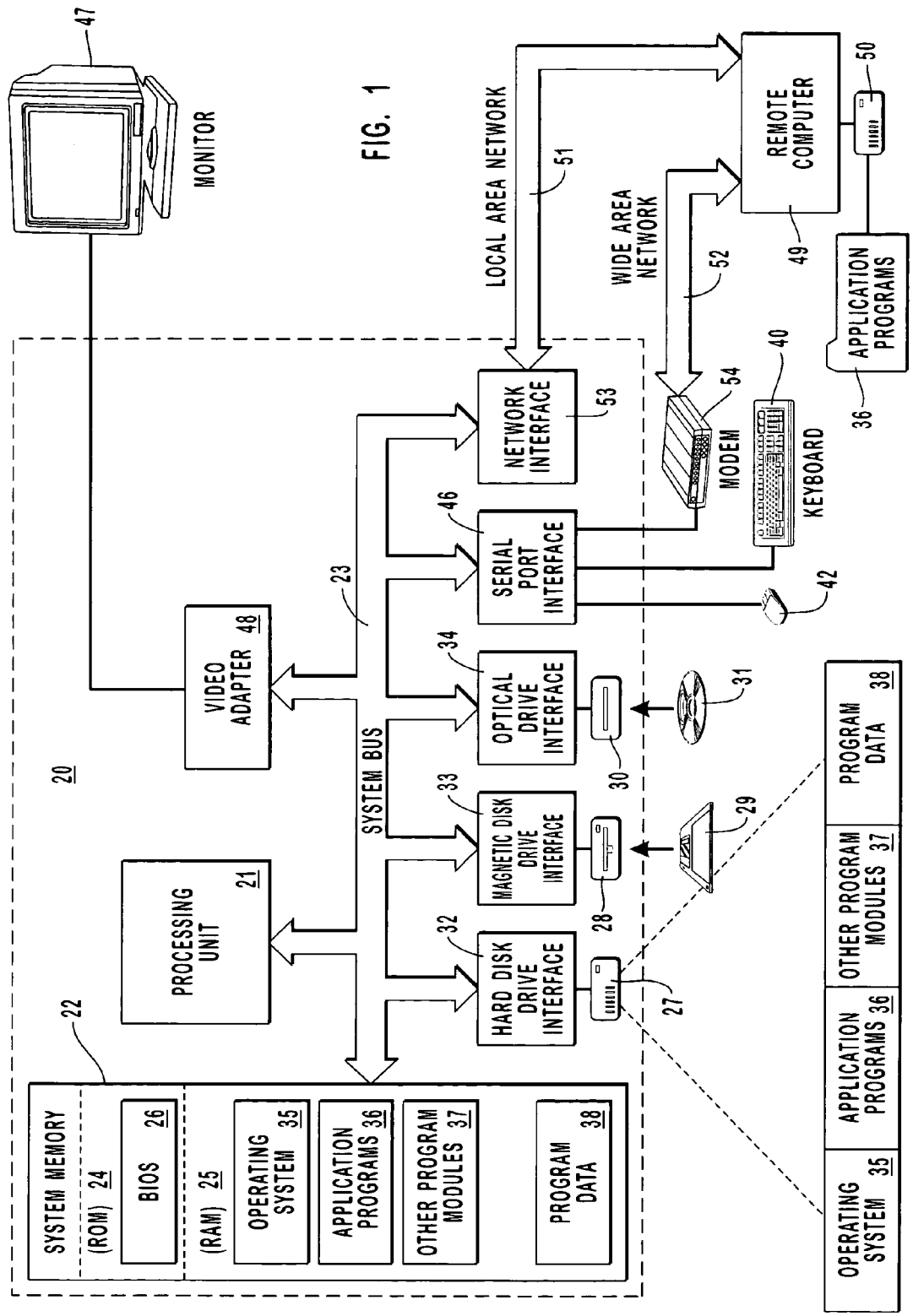
FIG. 1 is an example system that provides a suitable operating environment for the present invention.

The present invention addresses the problems that prior art electronic messaging services face when distributing a single message to multiple recipients. Rather than expending processing power to duplicate the electronic message for each recipient and rather than dedicating storage resources to retain each of the newly made copies, the present invention stores a single copy of the electronic message and sends a relatively small notification to each recipient. The notification provides access to the stored copy of the electronic message and may also include certain information regarding its content and origin.

The present invention also aids in organizing replies to an electronic message. By assigning a message identifier, each reply can be associated with the message that prompted the response. The association is helpful to a recipient because it provides context for the reply without requiring its author to duplicate the initial message with the response. Furthermore, the context established through association is applicable to each of possibly many replies, whereas, without association, a recipient would need to separately establish context for each reply received.

The invention is described below by using diagrams to illustrate either the structure or processing of embodiments used to implement the methods and systems of the present invention. Using the diagrams in this manner to present the invention should not be construed as limiting its scope. The present invention contemplates both methods and systems for processing electronic messages. The embodiments of the present invention may comprise a special purpose or general purpose computer comprising various computer hardware.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
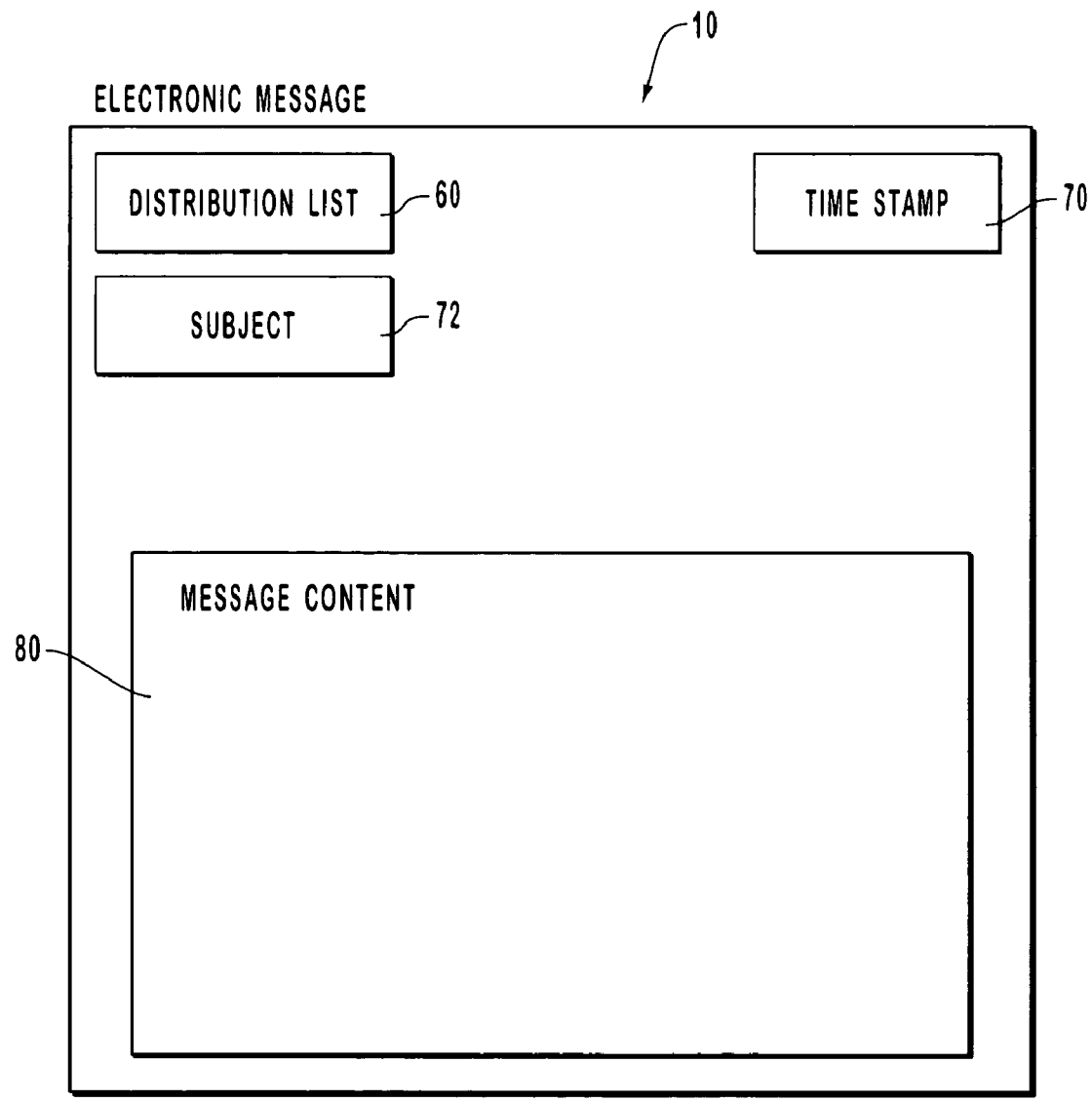
FIG. 2 illustrates the basic elements of one embodiment of an electronic message.

FIG. 2 illustrates the basic elements of electronic message 10. Although the invention will be described below in reference to electronic message 10 of FIG. 2, the invention can alternatively be practiced with other electronic messages having more or fewer elements. Specifically, distribution list 60 describes all intended recipients of electronic message 10. Although not shown separately, distribution list 60 includes direct recipients as well as those receiving normal or blind copies. Including blind copy recipients in distribution list 60 does not necessarily alter the rules of who will receive copies of a subsequent reply. That is, appearing on distribution list 60 does not mean that a client receiving a blind copy of an electronic message will be identifiable to other recipients and therefore potentially receive any later replies to the electronic message. Timestamp 70 is a general indication of a message's temporal context. It may represent the actual creation time, the time a message is received by an electronic messaging service for delivery, the actual delivery time, etc., or any combination thereof. Subject 72 is a field where the sender can summarize a message's content. Subject 72 aids recipients in evaluating the relative importance of any particular message without having to review the entire message. Finally, message content 80 represents a message's substantive content and may include minimally formatted text, binary data such as sound, images, executable files, and/or word processing documents, etc., that may be included with a message as an attachment or as the message itself.

Figure 3:
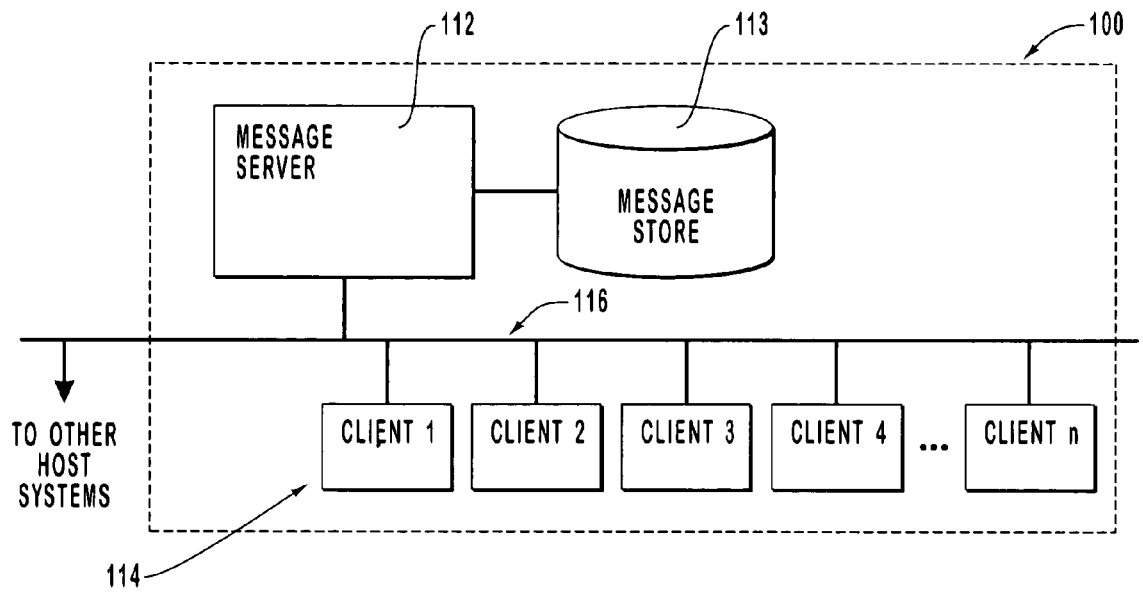
FIG. 3 illustrates the basic components of a host system that provides electronic messaging services.

FIG. 3 illustrates one example of the host systems that can be used to practice the present invention. In general, the host systems of the invention can be any system that provides electronic messaging services to users. Host system 100, which should not be seen as imposing any structural or architectural limitations on the invention, includes a message server 112 and clients 114. Message server 112 can be any network server or other computing device capable of managing electronic messaging services for clients 114. In this example, message server 112 is associated with a message store 113, which can be any suitable data storage system capable of storing message content 80 of an electronic message 10, as shown in FIG. 2. The process of storing message content 80 is further described below in reference to FIGS. 4-6. Clients 14, which are individually numbered client 1, client 2, client 3, client 4, ... client n, can be as few as one client or as many clients as host system 100 and message server 112 are capable of serving.

In the example of FIG. 3, message server 112 and clients 114 are connected by means of network 116, which may be a local area network, or a wide area network. In many cases, network 116 can be an organization-wide LAN configured to provide messaging services to users in the organization. Accordingly, clients 114 can be conventional client systems used in LANs or WANs, or any other suitable computing systems. For instance, clients 114 can be the computer 20 of FIG. 1. As shown in FIG. 3, host system 100 can be linked to other host systems. Host system 100 and, optionally, the other host systems designated by FIG. 3 represent one example of a messaging system.

Figure 4:
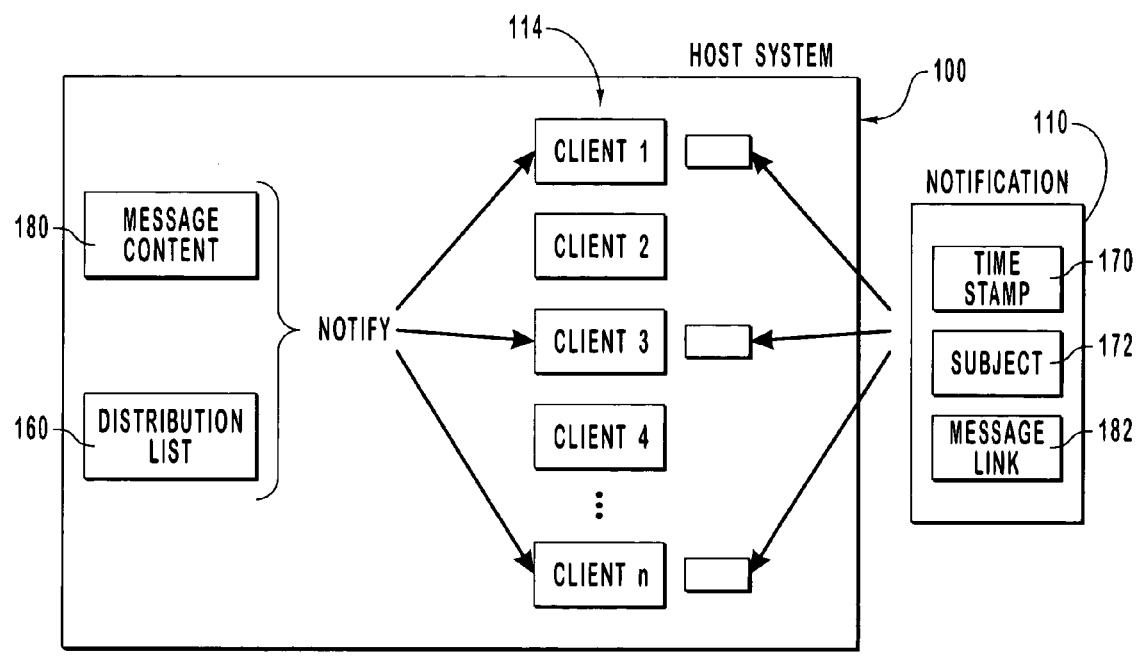
FIG. 4 illustrates how a preferred embodiment of the present invention processes electronic messages within a single host system environment.

FIG. 4 combines the basic elements of an electronic message 10, as illustrated in FIG. 2, and the basic elements of a host system 100 providing electronic messaging services, as illustrated in FIG. 3, to demonstrate the operation of a preferred embodiment of the present invention. The electronic messaging services of host system 100 function as follows. Limited copies of the message content 80 of FIG. 2 are stored as message 180 in, for example, message store 113 of FIG. 3. Generally, message 180 refers to a single electronic message. However, at times message 180 may also be viewed appropriately as an initial electronic message with associated replies and/or a forked electronic message as described below in connection with FIG. 5.

The limited copies are in contrast to traditional electronic messaging services that store a separate copy for each client who is a recipient of an electronic message. At a minimum, the preferred embodiment of FIG. 4 stores one copy of message 180. However, clients of host system 100 may be organized into diverse groups, with each group defining, for example, resources accessible by its members (among other things). Where clients are organized by group, host system 100 may store one copy of message 180 for each group having a member as an intended recipient of message 180.

Host system 100 also stores distribution list 60 of FIG. 2 as distribution list 160. Next, the host system 100 identifies which of clients 114 are recipients as listed in distribution list 160 and notifies each recipient of message 180 through notification 110. In this example of FIG. 4, clients 1, 3, and n are identified as recipients. Clients 1, 3, and n may be or may not be members of a common group.

Distribution list 160 may serve several purposes. In addition to containing the intended recipients, distribution list 160 may also provides means for tracking various actions that recipients perform with regard to message 180, such as recording recipients who access the message. However, this tracking also may be performed by message 180 itself, it may be part of the rules included with either the electronic message or host system providing electronic messaging services, or tracking may be implemented separately or as a subpart of some collection of functionality.

Notification 110 may include various data such as timestamp 170 and subject 172 that correspond to the timestamp 70 and subject 72 of FIG. 2. More importantly, notification 110 may include message link 182 for enabling the client to access the stored message 180. Timestamp 170, subject 172, and message link 182 are one example of a preferred embodiment's notification means for making message 180 available to recipients. A notification means may include other information such as a few lines of text, the message sender, etc. The present invention contemplates a variety of information as part of notification 10, including the above mentioned options being present either singly or in combination. It is only required that notification 110 provide some means for indicating the existence of message 180. This notification is in contrast to prior art systems that would duplicate electronic message 10, of FIG. 2, and store a copy for each recipient.

Another aspect of the embodiment of FIG. 4 is the ability to track access to message 180. Tracking may be useful as an auditing feature that allows the electronic messaging services of host system 100 to determine and report who has accessed message 180. Moreover, tracking access may be useful when considering rules for governing access and rules for determining lifetime as discussed below. Furthermore, one embodiment of the present invention notifies recipients when the distribution list changes and provides tools for examining the historical content of the distribution list, including comments to describe why specific changes were made.

The electronic messaging services also comprise rules for governing access to message 180. These rules may be defined as default rules to be used by the electronic messaging services or they may be defined on a message by message basis. Regardless, the rules may control access by determining, for example, if message 180 can be forwarded to new recipients, if message 180 can be downloaded from the message server to a local storage device, if distribution list 160 can be altered, and who is authorized to perform such actions. Altering distribution list 160 to add a new recipient grants access to message 180 through notification 110 as if the new recipient had been an original recipient. Altering distribution list 160 to remove a recipient revokes access to message 180 as if access had never been granted; future updates will not be available to the removed recipient. However, a recipient on distribution list 160 may have a local copy of message 180. By maintaining a local copy, a recipient removed from distribution list 160 will retain access to message 180 as it existed at the time of removal from the distribution list 160. Revocation may be accompanied by a message indicating that message 180 is no longer available to the client.

The electronic messaging services may also include rules for determining the lifetime of message 180. By way of example and not limitation, message 180 may only be useful through a given date, until everyone has read it, or until recipients no longer access it for a particular time. The rules may choose one of the above mentioned criteria or a combination thereof, or some other suitable parameter or combination for determining the lifetime of message 180. Rules may also indicate if the lifetime of message 180 can be extended and who is authorized to make an extension.

Figure 5:
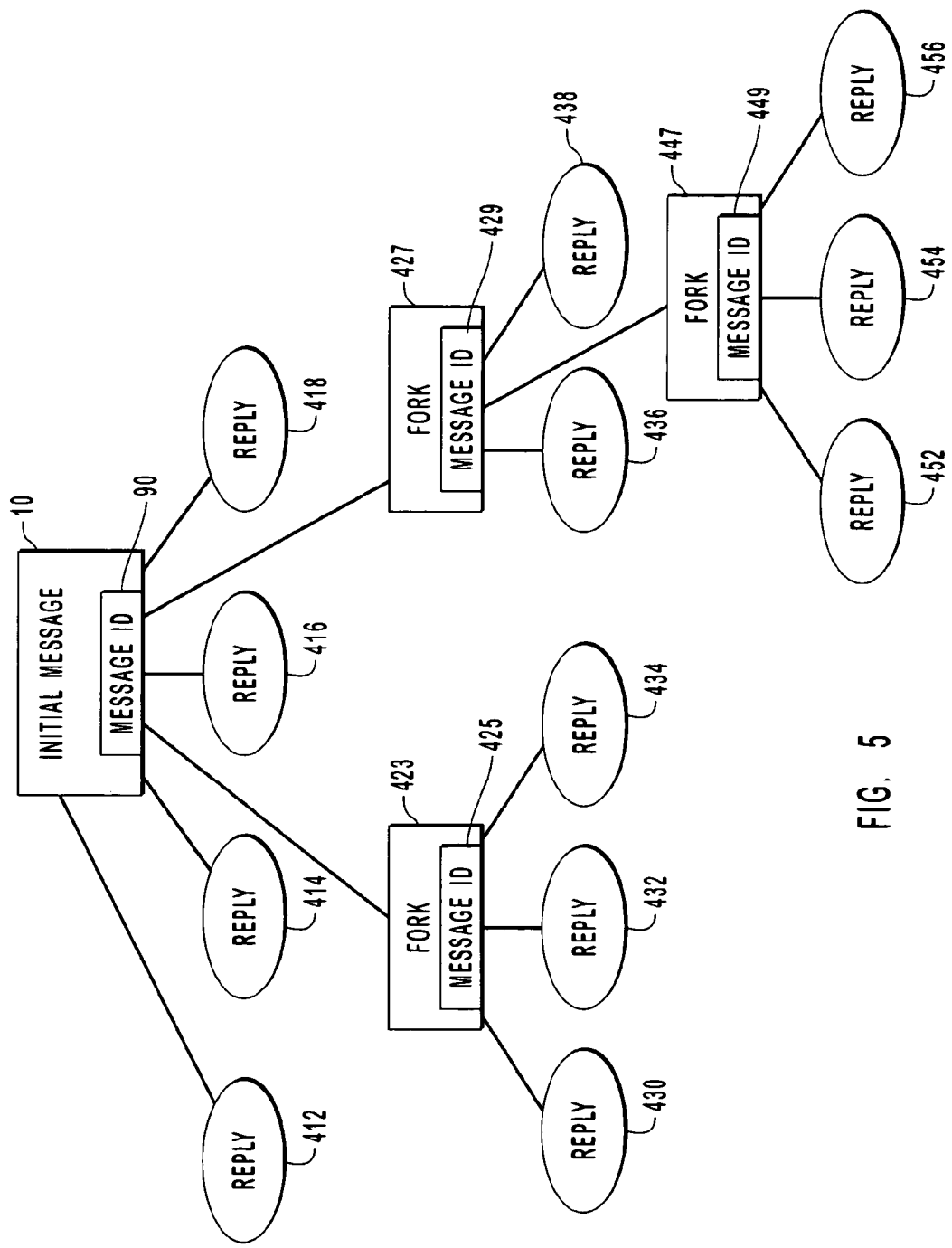
FIG. 5 illustrates how replies are associated with original messages.

FIG. 5 illustrates the organizational component of one embodiment of the present invention. In order to associate replies with the message that prompted them, each initial message 10 is assigned a message identifier 90. Message identifier 90 allows electronic messaging services of the host system to group replies by subject matter. As practiced in the prior art, conventional electronic messaging services intersperse replies with other electronic messages making it difficult for a recipient to follow a particular topic. Furthermore, as practiced in conventional systems, in an effort to aid other users in following the discussion, responses may duplicate the content of initial message 10 in the response, forcing the user to wade through the content of message 10 to reach the reply's substance.

In contrast, the embodiment of the present invention illustrated in FIG. 5 a associates replies to an initial message 10 using message identifier 90. FIG. 5 shows a hierarchical tree model by way of example rather than limitation; any hierarchical organization is within the scope of the present invention. Reply 412, reply 414, reply 416, and reply 418 all represent reply messages associated with initial message 10 through message identifier 90. This organization allows, for example, a recipient to view a display with initial message 10 for context along with the text of replies 412, 414, 416, and 418 without having the content of message 10 duplicated in each reply.

FIG. 5 also shows fork 423 and fork 427. In prior art systems, unintentional forks occur when individual topics begin to be discussed separately. Forking is a natural process that occurs based on the individual interests of each particular recipient. Participating in a forked discussion is like trying to listen to more than one person at the same time and makes establishing context a difficult task. Moreover, forking is further complicated when the original set of recipients splinters into subgroups discussing individual topics in detail. Forking is beneficial because it allows those with specific interests to focus their expertise without being subjected to larger discussions that may be irrelevant to them. Unintentional forking becomes especially problematic in prior art systems when recipients are added to a distribution list, because the added recipients must depend on others to provide them with the discussion's history. In conventional systems, it becomes difficult to separate the history from the current discussion due to the volume of information duplicated in the name of context. Moreover, context must be established on a message by message basis by examining timestamps and sorting through text copied from earlier messages.

In contrast to forking experienced in the prior art, fork 423 and fork 427 represent intentional forks according to an embodiment of the present invention. These intentional forks are based on recipients determining that a particular topic is more suited to a small group. Fork 423 generates a new message identifier 425 and includes associated replies 430, 432, and 434. Fork 427, with new message identifier 429, includes associated replies 436 and 438 as well as fork 447 having message identifier 449 and associated replies 452, 454, and 456. The advantage of the embodiment exemplified in FIG. 5 is that organization is a function of the electronic messaging services rather than the whim of an individual recipient saving messages on a given topic.

Furthermore, adding a recipient to the appropriate distribution list provides the new recipient with the topic history as well, because the new recipients access is identical to that of an original recipient. Moreover, the hierarchy provides context that carries from message for message. For example, replies 430, 432, and 434 all relate to the topic division made in fork 423.

Although the discussion associated with FIGS. 2 and 4 spoke in terms of message 180, whether a message is an initial message, a reply, or a response to a reply is immaterial to how the message is delivered to clients who are recipients. Therefore, FIGS. 2 and 4 could have been described accurately in terms of message/reply rather than simply message. With the preceding discussion introducing replies and their corresponding organization, FIG. 6 will describe messages and replies identically with regard to how they are distributed as any distinction is arbitrary. Nevertheless, the terms "message" and "reply" may be employed to indicate the relationship between several messages. Any descriptions of relationship with regard to distribution are by way of example and not intended as a limitation.

Figure 6:
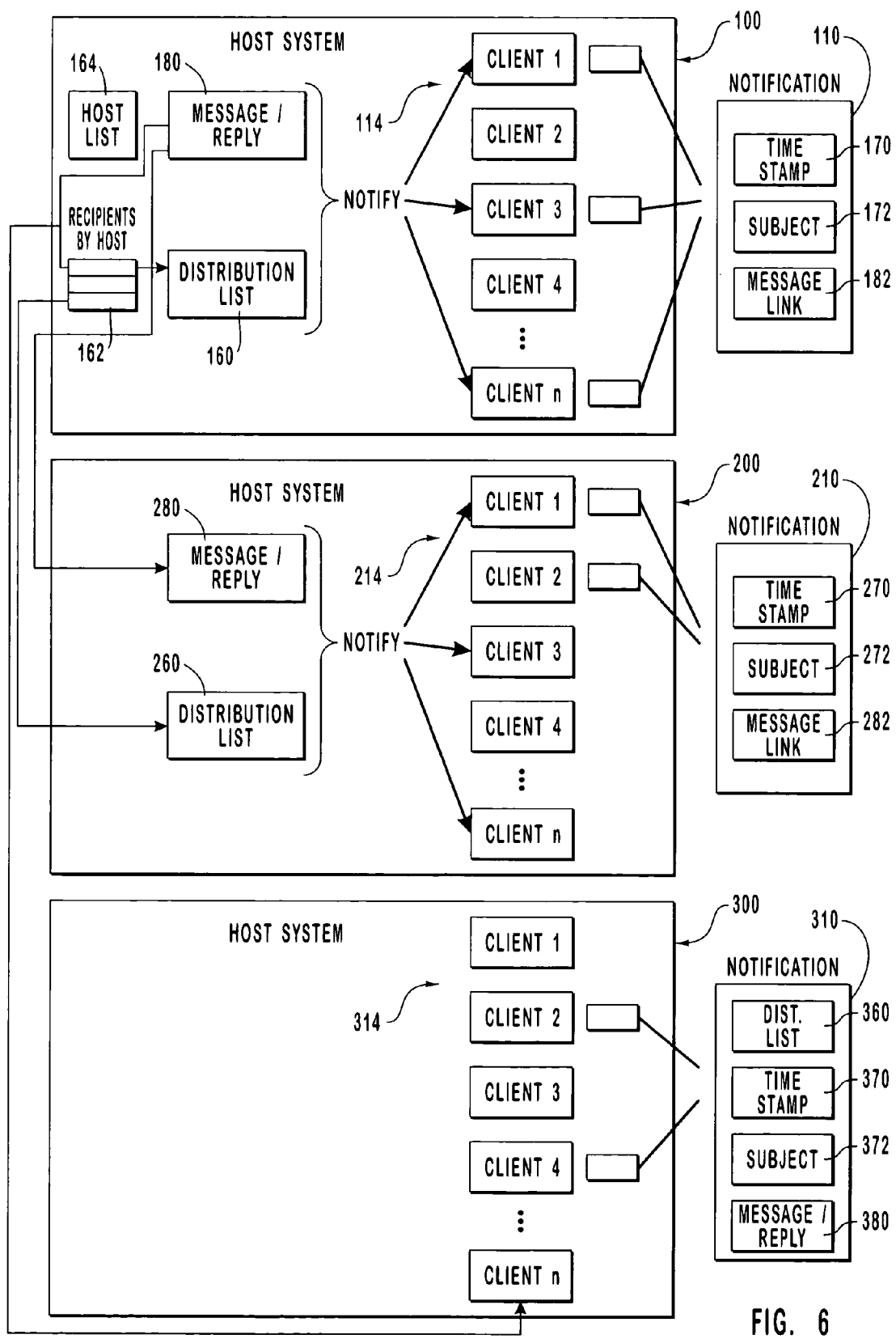
FIG. 6 illustrates how a preferred embodiment of the present invention processes electronic messages within a multiple host system environment where one host system providing electronic messaging services does not operate according to the present invention.

FIG. 6 illustrates the operation of an embodiment of the present invention within a multiple host system environment where at least one of the host systems providing electronic messaging services does not operate according to the present invention. Originating host system 100 notifies its clients who are recipients of an electronic message as described in relation to FIG. 4. However, message 180, shown in FIG. 4, may be either an initial message or reply and is therefore designated message/reply 180 in FIG. 6.

As the originating host system of message/reply 180, host system 100 is responsible for notifying other host systems serving clients who are recipients of message/reply 180. To this end, host system 100 creates host list 164 identifying each host system (e.g., host systems 100, 200, and 300) providing electronic messaging services to the recipients of message/reply 180. Host system 100 also creates a recipient by host list 162. List 162 organizes the recipients according to the host system that provides electronic messaging services to the recipients Host system 200 is identified by host system 100 as a host system that operates according to the current invention. Host system 100 transmits message/reply 180 and the portion of list 162 necessary for host system 200 to notify clients of host system 200 that are recipients of message/reply. Host system 200 stores the transmitted copy of message/reply 180 as message/reply 280 and the transmitted portion of list 162 as distribution list 260. In this example, host system 100 must also indicate how host system 200 should send replies to message/reply 180. This may be accomplished by identifying host system 100 as the originator of message/reply 180, meaning that all replies should be directed to host system 100 for distribution. Alternatively, host system 100 may transmit host list 164 and recipient by host list 162 to host system 200 so that host system 200 may distribute replies independent of host system 100. After receiving message/reply 180, stored as message/reply 280, and distribution list 160, stored as distribution list 260, host system 200 distributes message/reply 280 according to the description of host system 100 in FIG. 4 and organizes message/reply 280 according to the description of FIG. 5.

Host system 300 is identified as a host system that does not operate according to the present invention. For example, host system 300 may be incapable of storing a single copy of message/reply 180 and notifying recipients of the stored single copy. In response, host system 100 sends message/reply 180 using a protocol, which is not the one described in reference to host system 200, but is instead compatible with host system 100 and host system 300. One skilled in the art will recognize that several suitable protocols for use with host system 300 are available. In one example of using a protocol compatible with host system 300, host system 100 duplicates electronic message 10 of FIG. 2 for each recipient who is a client of host system 300. As shown in FIG. 6, electronic message 310 illustrates each of the duplicated electronic messages, containing a full distribution list 360, timestamp 370, subject 372, and message/reply 380, corresponding to the similarly number elements of electronic message 10 of FIG. 2.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a messaging system that provides clients with electronic messaging services, a method for organizing one or more replies to an electronic message, comprising the steps of:

assigning a unique identifier to the electronic message;

associating, using the unique identifier, the one or more replies with the electronic message;

storing a single copy of the electronic message at a host system, the single copy of the electronic message being enabled to be shared by a plurality of intended recipients; and storing single copy of the one or more replies at the host system, the single copy of the one or more replies being enabled to be shared by the plurality of intended recipients such that the one or more replies and the associated electronic message are enabled to be accessed by each of the plurality of intended recipients, and such that the single copy of the electronic message and the single copy of the one or more replies are shared by the plurality of intended recipients.

2. A method as recited in claim 1, further comprising the steps of:

assigning a reply identifier to a first reply created by a recipient of the electronic message; and using the reply identifier to associate, with the first reply, each of one or more subsequent replies created in response to the first reply.

3. A method as recited in claim 2, further comprising the step of separately presenting the electronic message, the first reply and the one or more subsequent replies to a recipient.

4. A method as recited in claim 3 wherein the step of separately presenting the electronic message, the first reply, and the one or more subsequent replies comprises the step of presenting to the recipient a tree arrangement wherein the electronic message is a trunk, the first reply is a first-level branch depending from the trunk, and the one or more subsequent replies are second-level branches depending from the first-level branch.

5. A method as recited in claim 1, further comprising the step of separately presenting the electronic message and the one or more replies to a recipient.

6. A method as recited in claim 1 wherein the method includes steps for distributing the electronic message to clients of a host system, comprising the steps of:
  creating one or more distribution lists including each client of the host system who is a recipient of the electronic message;
  storing at least one copy of the electronic message at the host system; and
  using the one or more distribution lists to notify each client of the host system who is a recipient of the electronic message, such that the at least one copy of the electronic message is made available to each notified client.

7. A method as recited in claim 6 wherein the method includes steps for distributing replies to the electronic message, comprising the steps of:
  assigning a unique list identifier to the distribution list;
  storing at least one copy of a reply created in response to the electronic message; and
  notifying each client who is a recipient of the reply using the unique list identifier, such that the at least one copy of the reply is made available to each client who is a recipient of the reply.

8. A method as recited in claim 1, further comprising the steps of:
  assigning a reply identifier to a first reply; and
  using the reply identifier to associate, with the first reply, each of one or more subsequent replies created in response to the first reply.

9. A system for organizing replies to an electronic message, the system comprising:
  processor means for uniquely identifying the electronic message;
  processor means for associating one or more replies with the uniquely identified electronic message;
  a storage means for storing a single copy of the electronic message at a host system to be shared by a plurality of intended recipients; and
  a storage means for storing single copy of the one or more replies at the host system to be shared by the plurality of intended recipients such that the one or more replies and the associated electronic message are enabled to be accessed by each of the plurality of intended recipients.

10. A system recited in claim 9 wherein a recipient of the electronic message can optionally fork a first reply, the system further comprising:
  processor means for uniquely identifying the first reply; and processor means for associating, with the first reply, each of one or more subsequent replies created in response to the first reply.

11. A system as recited in claim 10, the system further comprising means for separately presenting to a recipient the electronic message, the first reply and the one or more subsequent replies.

12. A system as recited in claim 9, the system further comprising means for separately presenting the electronic message and the one or more replies to a recipient.

13. A system as recited in claim 9 wherein the system includes a host system and means for distributing the electronic message, the system further comprising:
  processor means for creating one or more distribution lists including each client of the host system who is a recipient of the electronic message;
  storage means for storing at least one copy of the electronic message at the host system; and
  notification means for using the one or more distribution lists to notify each client of the host system who is a recipient of the electronic message, such that the at least one copy of the electronic message is made available to each notified client.

14. A system as recited in claim 13 wherein the system includes means for distributing replies to an electronic message, comprising:
  processor means for assigning a unique list identifier to the distribution list;
  storage means for storing a single copy of a reply created in response to the electronic message; and
  notification means for notifying each client who is a recipient of the reply using the unique list identifier, such that the single copy of the reply is made available to each notified client.

15. A system as recited in claim 14 wherein the system includes means for a recipient of the electronic message to optionally fork a first reply, comprising:
  processor means for assigning a reply identifier to the first reply; and
  processor means for using the unique identifier to associate, with the first reply, each of one or more subsequent replies created in response to the first reply.

16. A computer program product for implementing a method for organizing replies to an electronic message wherein the method is capable of being implemented in a messaging system that includes a host system and provides clients with electronic messaging services, the computer program product comprising:
  a computer-readable medium carrying computer-executable instructions for implementing the method wherein the computer-executable instructions comprise:
    program code means for assigning a unique identifier to the electronic message;
    program code means for associating, by using the unique identifier, one or more replies with the electronic message;
  program code means for storing a single copy of the electronic message at a host system, the single copy of the electronic message being enabled to be shared by a plurality of intended recipients; and
  program code means for storing single copy of the one or more replies at the host system, the single copy of the one or more replies being enabled to be shared by the plurality of intended recipients such that the one or more replies and the associated electronic message are enabled to be accessed by each of the plurality of intended recipients, and such that the single copy of the electronic message and the single copy of the one or more replies are shared by the plurality of intended recipients.

17. A computer program product as recited in claim 16 wherein the computer-executable instructions further comprise program code means for distributing the electronic message, comprising:
  program code means for creating one or more distribution lists including each client of the host system who is a recipient of the electronic message;
  program code means for storing at least one copy of the electronic message at the host system; and
  program code means for using the one or more distribution lists to notify each client of the host system who is a recipient of the electronic message, such that the at least one copy of the electronic message is made available to each notified client.

18. A computer program product as recited in claim 16 wherein the computer-executable instructions further comprise program code means for distributing one or more replies the electronic message, comprising:
    program code means for assigning a unique list identifier to the distribution list;
    program code means for storing at least one copy of a reply created in response to the electronic message; and
    program code means for notifying each client who is a recipient of the reply using the unique list identifier, such that the at least one copy of the reply is made available to each client who is a recipient of the reply.

\* \* \* \* \*